United States Patent
Dudley

[19]

[11] Patent Number: 5,906,677
[45] Date of Patent: May 25, 1999

[54] ELECTROSTATIC SUPERCHARGER SCREEN

[76] Inventor: Jesse R. Dudley, P.O. Box 40 749 Priceville Rd., Bonnieville, Ky. 42713

[21] Appl. No.: 08/851,581

[22] Filed: May 5, 1997

[51] Int. Cl.$^6$ .................................................... B03C 3/30
[52] U.S. Cl. ................... 96/17; 55/486; 55/528; 55/DIG. 31; 55/DIG. 35; 95/70; 96/55
[58] Field of Search .................................. 96/17, 57, 58, 96/55; 55/486, 528, DIG. 31, DIG. 35; 95/69, 70

[56] References Cited

U.S. PATENT DOCUMENTS

| | | | |
|---|---|---|---|
| 2,724,457 | 11/1955 | Besser | 96/17 |
| 2,992,700 | 7/1961 | Silverman et al. | 96/17 X |
| 3,307,332 | 3/1967 | Grace et al. | 96/58 X |
| 3,763,633 | 10/1973 | Soltis | 96/58 |
| 4,007,024 | 2/1977 | Sallee et al. | 96/58 X |
| 4,115,082 | 9/1978 | Newell | 55/528 X |
| 4,133,653 | 1/1979 | Soltis | 96/58 |
| 4,518,402 | 5/1985 | Dargel | 96/17 |
| 4,698,074 | 10/1987 | Cumming et al. | 96/58 |
| 4,880,448 | 11/1989 | Scherrer | 55/486 X |
| 4,902,306 | 2/1990 | Burnett et al. | 96/58 X |
| 5,075,000 | 12/1991 | Bernard et al. | 55/DIG. 31 |
| 5,336,299 | 8/1994 | Savell | 96/17 X |
| 5,525,134 | 6/1996 | Hodge | 96/17 |

FOREIGN PATENT DOCUMENTS

| | | | |
|---|---|---|---|
| 95/00248 | 1/1995 | WIPO | 96/17 |

*Primary Examiner*—Richard L. Chiesa
*Attorney, Agent, or Firm*—Michael I. Kroll

[57] ABSTRACT

An electrostatic supercharger screen (10) is within an air flow duct (12) in front of a standard air filter (14), between a furnace/cooling unit (16) and an air vent grill (18) in a wall (20) of a building (22). The screen (10) includes an element (24) for removing small microns of particles in air that goes past the standard air filter (14) within the air flow duct (12), so as to help clean the air of pollens, smoke, odors and bacteria. A structure (26) is for supporting the removing element (24) parallel to the standard air filter (14). A component (28) is for confining the removing element (24) and the supporting structure (26) in a juxtaposed relationship.

27 Claims, 2 Drawing Sheets

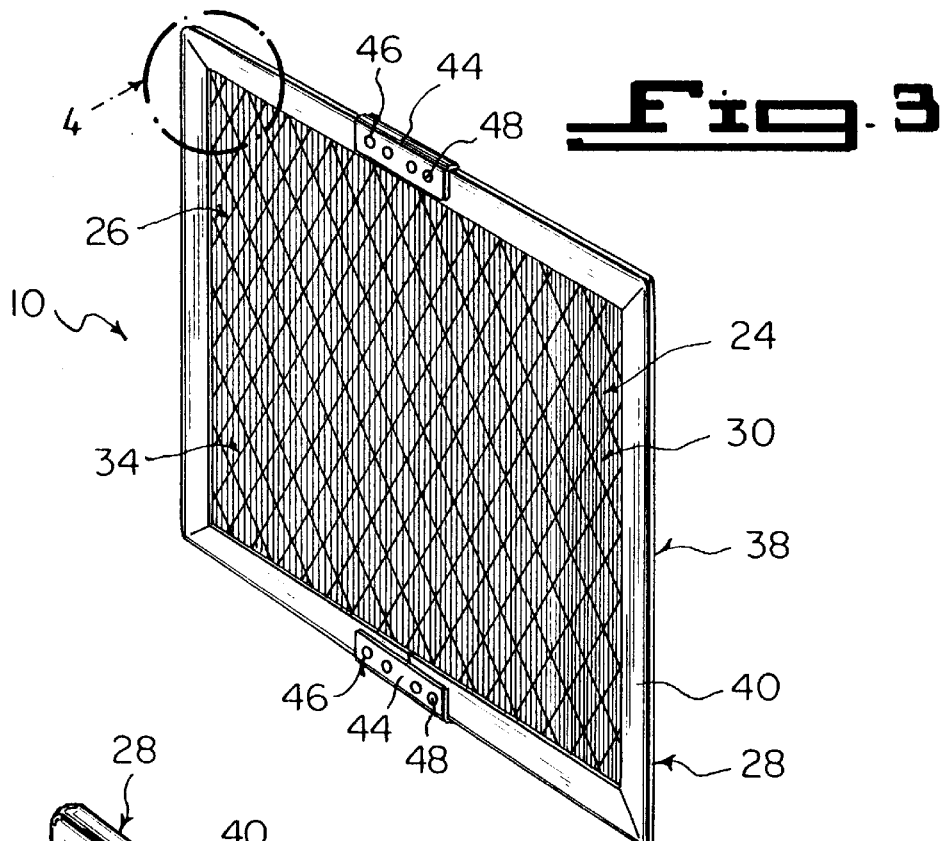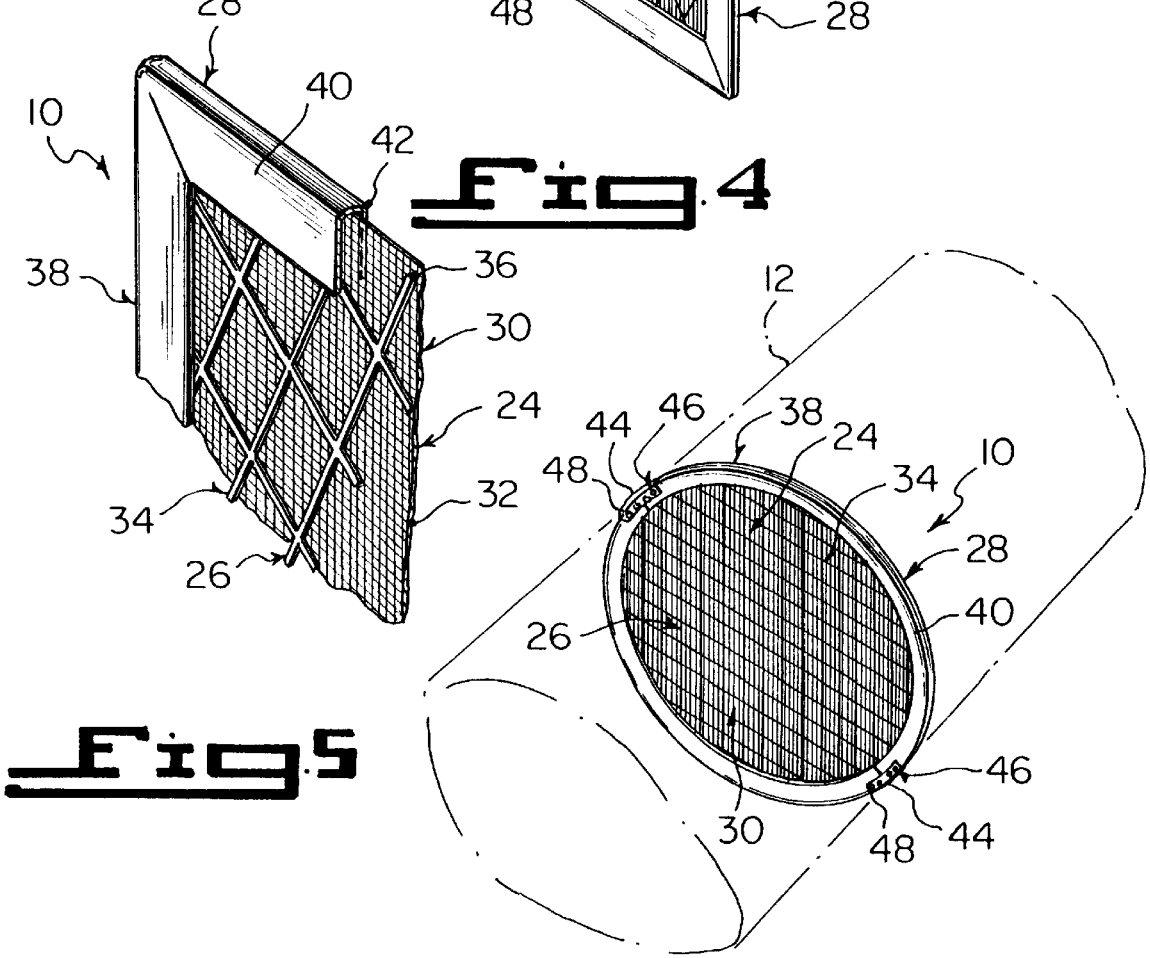

ELECTROSTATIC SUPERCHARGER SCREEN

BACKGROUND OF THE INVENTION

1. Field of the Invention

The instant invention relates generally to air filtering devices and more specifically it relates to an electrostatic supercharger screen. The electrostatic supercharger screen will remove small micron particles in an air flow duct that will normally flow through the air filter located behind the electrostatic supercharger screen.

2. Description of the Prior Art

Numerous air filtering devices have been provided in prior art. For example, U.S. Pat. Nos. 2,724,457 to Besser; 2,992,700 to Silverman et al.; 4,115,082 to Newell; 4,880,448 to Scherrer and 5,525,145 to Hodge all are illustrative of such prior art. While these units may be suitable for the particular purpose to which they address, they would not be as suitable for the purposes of the present invention as heretofore described.

BESSER, CHARLES S.

ELECTROSTATIC AIR FILTER
U.S. Pat. No. 2,724,457

An air filter comprising a plurality of juxtaposed sheets of loosely woven stiff electrostatic plastic threads each of the sheets has projections and depressions formed by distentions of some of the plastic threads forming the sheets therein. The projections serving to hold the sheets apart from each other and together with the depressions form air spaces between the sheets. A corrugated foraminated metal spacer is positioned between some of the sheets. A frame is for confining the sheets and the spacer in juxtaposed relation.

SILVERMAN, LESLIE ANDERSON, DAVID M.

ELECTROSTATIC AIR CLEANING DEVICE AND METHOD
U.S. Pat. No. 2,992,700

In an electrostatic filter for the elimination of particulate constituents from an aerosol. A bed of divided elements are formed of material and has an ability to be charged with and maintain a charge of static electricity. At least one element of material dissimilar to the divided elements material is in contact with the bed. A means is for maintaining the bed in a boiling, fluidized state by flowing upwardly therethrough the aerosol under a pressure drop across the bed substantially equal to the sum of the weight of the bed per unit cross-sectional area plus the pressure drop equal to the friction of the bed against the wall of the filter, causing circulation of the divided elements and continuous intimate contact between the divided elements and the one element to cause the tri-boelectrification of the boiling bed and thereby the electrostatic removal of the particulate constituents from the aerosol passing therethrough.

NEWELL, JOHN HENRY

AIR CLEANER ASSEMBLY
U.S. Pat. No. 4,115,082

An air cleaner assembly of the flow through type has a central element of open cell foam rubber, such as foam polyurethane, two series of rigid thermoplastic rods sandwiching the central element, the rods being capable of developing and holding a positive electrostatic charge, and first and second air permeable outer sheet elements of synthetic fibers, such as polypropylers, overlaying each of the series of rods the assembly has enhanced air cleaning abilities, is readily washable, and produces an atmosphere containing increased concentration of negative ions.

SCHERRER, FERNAND

DOUBLE FILTER INSERT FOR AN AIR CLEANING APPARATUS
U.S. Pat. No. 4,880,448

A double filter insert for an air cleaning apparatus having an ionizer, consisting of a sheet-like pre-filter of polyester for retaining coarse dust particles and of an also sheet-like electrostatic filter of non-woven fabric for removing also finest-grain floating particles from the air circulating through the air cleaning apparatus. According to the invention, the double filter insert is characterized by at least one inspection opening which, for making visible the degree of contamination of the electrostatic filter is provided in the fabric of the overlying pre-filter. The electrostatic filter in the new condition is of a distinctly brighter color than the pre-filter.

HODGE, JOSEPH

FILTERING APPARATUS FOR A FORCED AIR DUCT GRILL
U.S. Pat. No. 5,525,145

A filter apparatus has a rigid housing surrounding a piece of preferably self charging electrostatic filter material and having a preferably magnetic attachment device for mounting the filter apparatus directly in front of a grill at an end of a cold air return or supply of a forced air system, for a heating and/or air conditioning system. The filter and housing are generally sized so that the frame does not cover any of the openings on the grill over which it is designed to be placed. Decorative openwork is positioned in the front of the filter material to provide an esthetically pleasing covering of what is considered less than attractive filter material.

SUMMARY OF THE INVENTION

A primary object of the present invention is to provide an electrostatic supercharger screen that will overcome the shortcomings of the prior art devices.

Another object is to provide an electrostatic supercharger screen that will fit into an air flow duct in front of a standard air filter, so as to remove small micron particles, such as pollens, smoke, odors and bacteria that will normally flow through the air filter.

An additional object is to provide an electrostatic supercharger screen that will electrostatically charge the small micron particles in the air flow duct and collect them on a fine mesh layer, which is supported by a larger wire mesh layer within a frame.

A further object is to provide an electrostatic supercharger screen that is simple and easy to use.

A still further object is to provide an electrostatic supercharger screen that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a perspective view of the instant invention per se.

FIG. 4 is an enlarged perspective view of an area in FIG. 4 indicated by arrow 4 in FIG. 3, showing the various components thereof in greater detail.

FIG. 5 is a perspective view of a modified form of the instant invention being circular shaped for a cylindrical shaped air flow duct, shown in phantom.

Similar reference characters denote corresponding features consistently throughout the attached drawings.

DETAILED DESCRIPTION OF THE PREFERRED EMBODIMENTS

Figure 1:
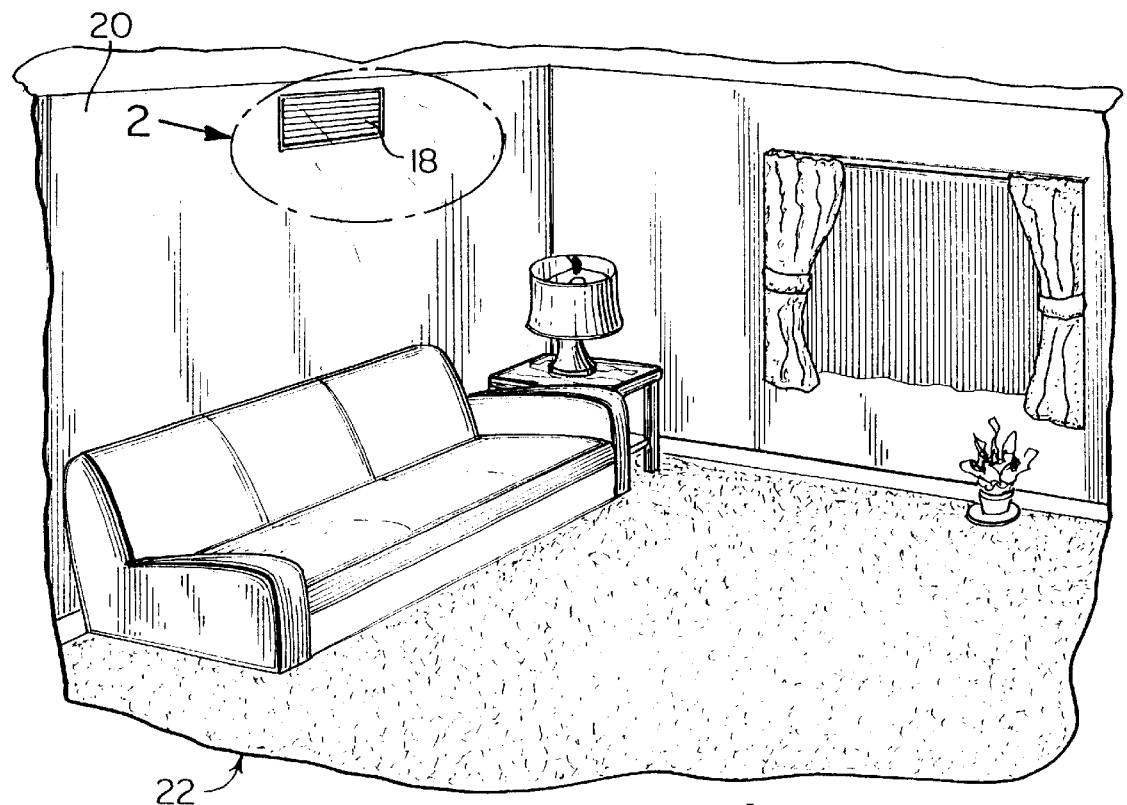
FIG. 1 is a perspective view of a portion of a room, showing an air vent grill in the wall for a furnace/cooling unit.

Turning now descriptively to the drawings, in which similar reference characters denote similar elements throughout the several views, FIGS. 1 through 5 illustrate an electrostatic supercharger screen 10. With regard to the reference numerals used, the following numbering is used throughout the various drawing figures.

10 electrostatic supercharger screen
12 air flow duct
14 standard air filter in 12
16 furnace/cooling unit
18 air vent grill in 20
20 wall of 22
22 building
24 removing element of 10
26 supporting structure of 10
28 confining component of 10 for 24 and 26
30 self charging electrostatic sheet for 24
32 fine polypropylene mesh material of 30
34 large grid sheet for 26
36 strong metal mesh material of 34
38 frame for 28
40 U-shaped channel of 38
42 material (aluminum, other metals, plastic) of 38
44 U-shaped clip of 38
46 fastener for 44
48 rivet for 46

The electrostatic supercharger screen 10 is within an air flow duct 12 in front of a standard air filter 14, between a furnace/cooling unit 16 and an air vent grill 18 in a wall 20 of a building 22. The screen comprises an element 24 for removing small microns of particles in air that goes past the standard air filter 14 within the air flow duct 12, so as to help clean the air of pollens, smoke, odors and bacteria. A structure 26 is for supporting the removing element 24 parallel to the standard air filter 14. A component 28 is for confining the removing element 24 and the supporting structure 26 in a juxtaposed relationship.

The removing element 24 is a self charging electrostatic sheet 30 sized to entirely cover the standard air filter 14 within the air flow duct 12. The self charging electrostatic sheet 30 is fabricated out of a fine polypropylene mesh material 32. The fine polypropylene mesh material 32 includes fibers typically but not limited to be 0.012 of an inch thick.

The supporting structure 26 is a large grid sheet 34 sized to entirely cover the removing element 24. The large grid sheet 34 is fabricated out of a strong metal mesh material 36. The strong metal mesh material 36 includes wires typically but not limited to be 0.053 of an inch thick.

The confining component 28 is a frame 38 that completely extends around a periphery of the removing element 24 and the supporting structure 26. The frame 38 is formed into a U-shaped channel 40, to engage with the periphery of the removing element 24 and the supporting structure 26.

The frame 38 is fabricated out of material 42 selected from a group consisting of aluminum, other metals and plastic. The frame 38 before it's formed into the U-shaped channel 40, is typically but not limited to be one inch wide and 0.030 of an inch thick.

The frame 38 is split into two sections and includes a pair of U-shaped clips 44. A plurality of fasteners 46 are for attaching each U-shaped clip 44 between abutting ends of the sections of the frame 38. Each fastener 46 is a rivet 48.

Figure 2:
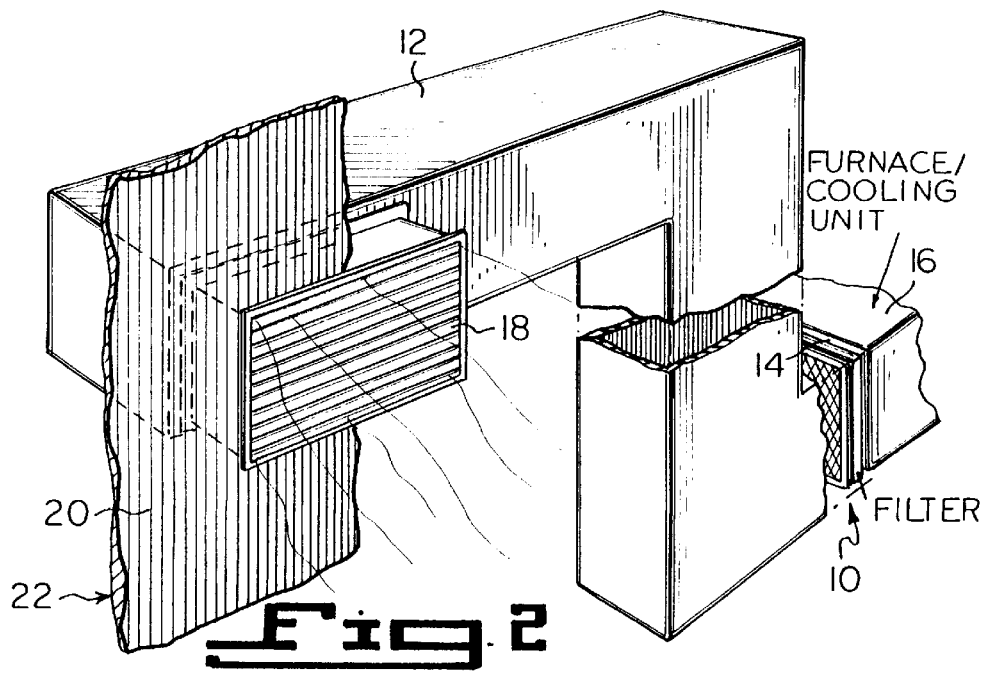
FIG. 2 is an enlarged perspective view of an area in FIG. 1 indicated by arrow 2, broken away and in section, showing the instant invention installed within an air flow duct for the furnace/cooling unit.

The frame 38, as shown in FIGS. 2 through 4, is rectangular shaped about the periphery of the removing element 24 and the supporting structure 26, so that the screen 10 can fit into the air flow duct 12 which is rectangular shaped in cross section. The frame 38 in Figure 5, is circular shaped about the periphery of the removing element 24 and the supporting structure 26, so that the screen 10 can fit into the air flow duct 12 which is circular shaped in cross section.

OPERATION OF THE INVENTION

To use electrostatic supercharger screen 10, the following steps should be taken:

1. Insert the standard air filter 14 into a slot within the air flow duct 12.
2. Place the frame 38 with the removing element 24 and the supporting structure 26 into the slot within the air flow duct 12, so that it is in front of and adjacent the standard air filter 14.
3. Make sure that the self charging electrostatic sheet 30, which is the removing element 24, up against and covering the standard air filter 14.
4. Turn on the furnace/cooling unit 16, to allow the small microns of particles in the air to go past the standard air filter 14 and be trapped by the self charging electrostatic sheet 30, so that the air will be cleaned of pollens, smoke, odors and bacteria.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An electrostatic supercharger screen within an air flow duct in front of an air filter, between a furnace/cooling unit and an air vent grill in a wall of a building, said screen comprising:

a) means for removing small microns of particles in air that goes past the air filter within the air flow duct, so as to help clean the air of pollens, smoke, odors and bacteria;

b) means for supporting said removing means parallel to the air filter; and c) means for confining said removing means and said supporting means in a juxtaposed relationship.

2. An electrostatic supercharger screen as recited in claim 1, wherein said removing means is a self charging electrostatic sheet sized to entirely cover the standard air filter within the air flow duct.

3. An electrostatic supercharger screen as recited in claim 2, wherein said self charging electrostatic sheet is fabricated out of a fine polypropylene mesh material.

4. An electrostatic supercharger screen as recited in claim 3, wherein said fine polypropylene mesh material includes fibers which are at least 0.012 of an inch thick.

5. An electrostatic supercharger screen as recited in claim 1, wherein said supporting means is a large grid sheet sized to entirely cover said removing means.

6. An electrostatic supercharger screen as recited in claim 5, wherein said large grid sheet is fabricated out of a strong metal mesh material.

7. An electrostatic supercharger screen as recited in claim 6, wherein said strong metal mesh material includes wires which are at least 0.053 of an inch thick.

8. An electrostatic supercharger screen as recited in claim 1, wherein said confining means is a frame that completely extends around a periphery of said removing means and said supporting means.

9. An electrostatic supercharger screen as recited in claim 8, wherein said frame is fabricated out of material selected from a group consisting of aluminum, other metals and plastic.

10. An electrostatic supercharger screen as recited in claim 8, wherein said frame is split into two sections and includes:

a) a pair of U-shaped clips; and b) a plurality of fasteners for attaching each said U-shaped clip between abutting ends of said sections of said frame.

11. An electrostatic supercharger screen as recited in claim 10, wherein each said fastener is a rivet.

12. An electrostatic supercharger screen as recited in claim 8, wherein said frame is rectangular shaped about the periphery of said removing means and said supporting means, so that said screen can fit into the air flow duct which is rectangular shaped in cross section.

13. An electrostatic supercharger screen as recited in claim 8, wherein said frame is circular shaped about the periphery of said removing means and said supporting means, so that said screen can fit into the air flow duct which is circular shaped in cross section.

14. An electrostatic supercharger screen as recited in claim 8, wherein said frame is formed into a U-shaped channel to engage with the periphery of said removing means and said supporting means.

15. An electrostatic supercharger screen as recited in claim 14, wherein said frame before it's formed into said U-shaped channel, is at least one inch wide and 0.030 of an inch thick.

16. An electrostatic supercharger screen within an air flow duct in front of an air filter, between a furnace/cooling unit and an air vent grill in a wall of a building, said screen comprising:

a) means for removing small microns of particles in air that goes past the air filter within the air flow duct, so as to help clean the air of pollens, smoke, odors and bacteria, wherein said removing means is a self charging electrostatic sheet sized to entirely cover the air filter within the air flow duct;

b) means for supporting said removing means parallel to the air filter, wherein said supporting means is a large grid sheet sized to entirely cover said removing means; and c) means for confining said removing means and said supporting means in a juxtaposed relationship, wherein said confining means is a frame that completely extends around a periphery of said removing means and said supporting means.

17. An electrostatic supercharger screen as recited in claim 16, wherein said self charging electrostatic sheet is fabricated out of a fine polypropylene mesh material.

18. An electrostatic supercharger screen as recited in claim 17, wherein said fine polypropylene mesh material includes fibers which are at least 0.012 of an inch thick.

19. An electrostatic supercharger screen as recited in claim 18, wherein said large grid sheet is fabricated out of a strong metal mesh material.

20. An electrostatic supercharger screen as recited in claim 19, wherein said strong metal mesh material includes wires which are at least 0.053 of an inch thick.

21. An electrostatic supercharger screen as recited in claim 20, wherein said frame is formed into a U-shaped channel to engage with the periphery of said removing means and said supporting means.

22. An electrostatic supercharger screen as recited in claim 21, wherein said frame is fabricated out of material selected from a group consisting of aluminum, other metals and plastic.

23. An electrostatic supercharger screen as recited in claim 22, wherein said frame before it's formed into said U-shaped channel, is at least one inch wide and 0.030 of an inch thick.

24. An electrostatic supercharger screen as recited in claim 23, wherein said frame is split into two sections and includes:

a) a pair of U-shaped clips; and b) a plurality of fasteners for attaching each said U-shaped clip between abutting ends of said sections of said frame.

25. An electrostatic supercharger screen as recited in claim 24, wherein each said fastener is a rivet.

26. An electrostatic supercharger screen as recited in claim 25, wherein said frame is rectangular shaped about the periphery of said removing means and said supporting means, so that said screen can fit into the air flow duct which is rectangular shaped in cross section.

27. An electrostatic supercharger screen as recited in claim 25, wherein said frame is circular shaped about the periphery of said removing means and said supporting means, so that said screen can fit into the air flow duct which is circular shaped in cross section.

* * * * *